June 26, 1934.  J. BLACKBURN  1,964,448
FRICTIONAL WIRE CONNECTER
Filed March 12, 1934

INVENTOR
JASPER BLACKBURN
By Adam E. Fisher
ATTORNEY

Patented June 26, 1934

1,964,448

UNITED STATES PATENT OFFICE 1,964,448

FRICTIONAL WIRE CONNECTER

Jasper Blackburn, Webster Groves, Mo.

Application March 12, 1934, Serial No. 715,078

3 Claims. (Cl. 173—263)

This invention pertains to frictional wire connecters or clamps, as commonly used in the construction, repair and extension of electrical systems such as telephone, telegraph, light and power lines, for the purpose of connecting tap or service lines to the main lines, or for similar purposes. This invention more particularly relates to that class of such connecters employing a longitudinally slotted bolt-like member or keeper having a unitary nut and washer assembly operatively mounted thereupon, the washer having a diametrical rib adapted to slidably pass into the slot of the keeper. One of the principal objects of the invention is to provide in a connecter of the kind referred to, the combination with an elongated and longitudinally slotted and threaded bolt-like keeper, the slot thereof opening out thru one end as a wire receiving slot and forming the keeper with two spaced legs connected by a head, and a unitary nut and washer assembly mounted thereupon, the washer including an outer ring and a diametrical rib extended thru the wire slot of the keeper, of a pendant swingingly connected at the extremity of one of the legs of the keeper and formed and adapted to pass partially thru the aperture between the ring and the rib of the washer to enable the washer to be withdrawn clear of the end of the keeper, the pendant however having an enlargement at its outer extremity too large to pass thru said aperture, whereby the washer and associated nut are operatively anchored to the keeper but may be drawn off onto the pendant and all swung aside for admitting wires into the wire slot of the keeper.

Another object is to provide in a connecter embodying an elongated and longitudinally slotted and exteriorly threaded bolt-like keeper, the said slot opening out thru one end as a wire receiving slot and providing the keeper with two spaced legs, and a unitary nut and washer assembly operatively mounted thereupon, the washer including a cupped ring for encircling the keeper and having a diametrical rib adapted to slidably engage the wire slot of the keeper, a pendant swingingly connected at the extremity of one of the legs of the keeper and adapted to fold into the said wire receiving slot thereof, the pendant being relatively attenuated at its inner connected end so as to pass partially thru the aperture between the ring and the rib of the washer for enabling the washer and connected nut to be withdrawn onto this attenuated portion of the pendant clear of the end of the keeper, the outer free end of the pendant however being enlarged to prevent its passing thru said aperture, whereby the elements are operatively connected and the washer and nut assembly may be drawn off onto the pendant and swung aside for admitting wires into the wire slot of the keeper.

Still another object is to provide, in a connecter embodying an elongated and longitudinally slotted and threaded bolt-like keeper having two spaced legs of unequal length connected at one end by a head, and a unitary nut and washer assembly operatively mounted thereupon, the washer including a ring for encircling the keeper and a rib for slidably passing within the slot of the keeper, a pendant element or flap hingedly connected at one end to the extremity of the shorter leg of the keeper the portion thereof adjacent its connected end being formed to pass freely thru the opening between the ring and rib of the washer, the outer free end of the pendant element however being formed to prevent its passing thru said opening, whereby the elements are all operatively joined and the nut and washer assembly may be drawn off onto the pendant element and swung aside for admitting wires into the wire slot of the keeper.

With these and such other objects and advantages in view as may be developed in the following specification, attention is directed to the accompanying drawing as constituting part of the specification, the same exemplifying certain preferred forms of the invention, and wherein.

Figure 1:
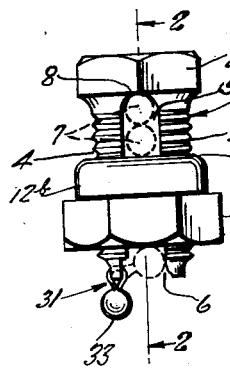
Figure 1 is a side elevation of one preferred form of the invention, showing the connecter as in use for joining two wires.
Figure 2:
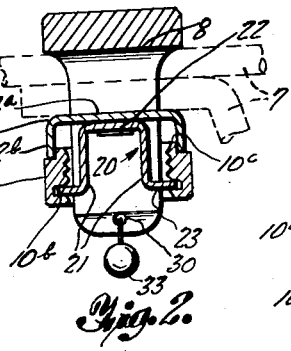
Figure 2 is a longitudinal section on the line 2—2 of Figure 1.
Figure 3:
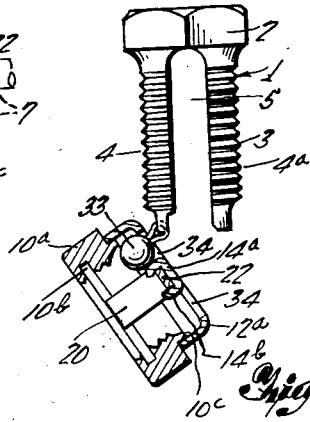
Figure 3 is a side elevation of the connecter alone, the nut and washer assembly thereof being shown in section, suspended upon the pendant at the extremity of one of the legs and swung aside for opening the wire slot of the connecter.
Figure 4:
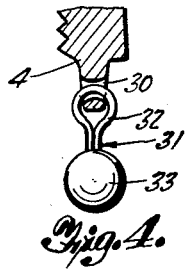
Figure 4 is an enlarged detail of the pendant as swingingly mounted at the extremity of one of the legs of the connecter, the extremity only of the leg being shown and that in section.

In the form represented in Figures 1 to 4 of the drawing, the invention employs a conventional form of elongated bolt-like member or keeper 1, the same having the faced head 2, the body being exteriorly threaded as shown at 3, and being longitudinally slotted medially to provide the spaced and segmentally screw-threaded legs or sides 4—4a, the slot itself constituting the wire receiving slot 5, which opens out thru the end of the member 1 as shown at 6, for the admission of the wires 7 which are to be joined, the same being forced up into the wire seat 8 at the inner side of the head 2. A nut 10a is provided and adapted to threadedly engage the bolt member 1 over the threaded sides or legs 4—4a thereof. The nut 10a is here shown as formed with an interior, circumferential groove or race 10b cutting thru the threads of the nut and with an annular, raised boss 10c upon its predetermined inner face as mounted upon the bolt member or keeper 1. An annular, cupped washer 12a, having the deeply turned lateral rim or skirt 12b is freely and rotatably seated over the boss 10c with the said rim bearing edgewise slidably upon the face of the nut, exteriorly of the boss 10c, the ring of the washer being adapted to freely embrace the member 1 and having a transverse or diametrical bearing rib 14a adapted to pass freely into and along the wire slot 5 of the member 1. A flat, looped brace 20 comprising spaced legs 21 joined by a connecting bight 22 is mounted within the orifice of the nut 10a, the extremities 23 of the legs being turned out as feet and slidably disposed within the race 10b of the nut, the bight of the brace being reduced to form a neck 22 and being disposed thru the inner face of the nut as mounted upon the bolt and positioned flush with or somewhat beyond the face of the boss 10c, as clearly shown in Figure 2, and so as to contact with and reinforce and support the diametrical bearing rib 14a of the washer. The depth of the skirt 12b of the washer 12a is the factor determinative of the extent of the inward spacing of the neck 22 of the brace 20 and the rib 14a of the washer 12a from the face of the boss 12c. The washer 12a may be operatively and rotatably anchored to its seat upon the nut by extending ears 14b laterally from the rib 14a and pinching these ears over the neck 22 of the brace 20 which is rotatably yoked within the bore of the nut, as already pointed out, and as represented in Figure 3. An aperture 30 is pierced thru the free extremity of one of the legs, as the leg 4, and a pendant 31 is freely suspended therefrom, the pendant including an open wire link 32 loosely passed thru the said aperture and a connected small globule or pellet 33 depending at the end of this link. This pellet should be larger than the opening or aperture 34 between the ring of the washer 12a and its rib 14a, so that it cannot pass therethru. In mounting the washer and nut assembly upon the keeper, the link 32 is passed freely thru the aperture 34 of the washer 12a with the pellet 33 disposed within the cup of the washer, whereby the said washer and connected nut are held freely and swingingly pendant at the extremity of the leg 4, thus providing a unitary connecter.

In the use and operation of the above described form of connecter the nut and washer assembly is first fully unturned or withdrawn from the threaded legs 4—4a and drawn off onto the pendant 31, where it is loosely retained by the pellet 33, in manner already pointed out. The whole assembly may now be swung aside for admitting the wires 7 thru the wire slot 5 to the seat 8. The nut and washer assembly is then replaced and turned up against the wires, locking them in place. When this is accomplished, the pendant 31 may be folded into the mouth 6 of the slot 5, entirely out of the way and thereby facilitating the taping of the joint, as there are then no projecting parts to interfere therewith. The described folded position of the pendant is indicated in dotted lines in Figure 1. When the nut and washer assembly is swung aside or drawn off onto the pendant, it will be noted from Figure 3 that the pellet 33 passes entirely within the cup of the washer 12a and inside the skirt 12b thereof, contacting only the skirt and the diametrical elements 14a and 22, and does not contact the nut 10a at all.

Figure 5:
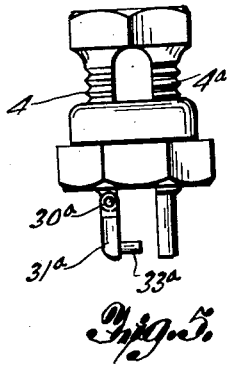
Figure 5 is a side elevation of a modified form of connecter, the legs thereof being of unequal length and a pendant element or flap being hinged to the extremity of the shorter leg.
Figure 6:
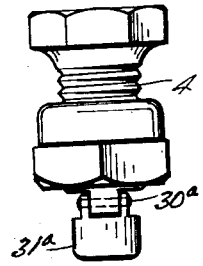
Figure 6 is an elevation of the form of connecter shown in Figure 5, taken at ninety degrees thereto and at the side showing the hinged pendant.
Figure 7:
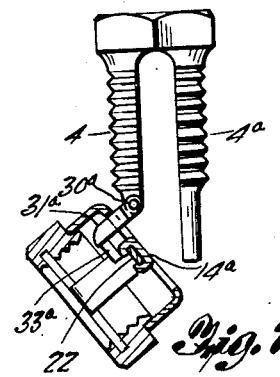
Figure 7 is an elevation of the said modified form, showing the nut and washer assembly in section and swung open upon the hinged pendant, as for the admission of wires.

In the modified form of connecter represented in Figures 5 to 7, the leg 4 is formed shorter than the leg 4a, as clearly shown in Figure 5, and a more substantial pendant element or flap 31a is provided and is hinged at 30a to the extremity of the shorter leg, the same constituting in fact substantially a continuation of this leg 4, tho swingingly connected to the leg proper. A pin or stud 33a is set into the inner face of the pendant element 31a and functions to intercept the connected elements 14a of the washer and neck 22 of the brace on the withdrawal of the nut and washer assembly, substantially as does the pellet 33 of the previously described form of connecter, thus freely and operatively anchoring the nut and washer assembly to the keeper, in a unitary assembly. Owing to the depth of the skirt 12b of the washer, in this form also the stud 33a alone contacts the said diametrical elements 14a and 22 of washer and brace, and no part of the pendant 31a contacts with the nut itself. In other words in both structures the washers are supported upon the pendants without contact with the nuts, the latter in turn being supported rotatably upon the washers. The use and operation of the form of connecter shown in Figures 5 to 7 is substantially the same as with the first form shown in Figures 1 to 4 and is clearly illustrated in the drawing.

The washer and nut assembly herein described is employed here merely in an illustrative manner, and the same constitutes in itself no part of this invention, except as a form of such assembly well adapted to carry out the purposes of this invention in combination with the forms of pendants shown or modifications thereof. This said form of washer and nut assembly is described again, and claimed particularly, in my co-pending application, Serial Number 703,174, filed December 20, 1933. Any other unitary form of washer and nut assembly might be employed in lieu of the one shown here, provided the same included on the washer the diametrical rib or equivalent thereof for extending thru the slot of the keeper, and which would be intercepted by the swinging pendant on the withdrawal of the said assembly.

In lieu of the form of washer or bearing element here shown, it is manifest that any other suitable form of washer, rider or bearing element might be employed to adapt the connecter to any special requirement. Any form of element serving as the equivalent of the washer described would be considered as within the purview of this invention, and while I have herein shown and described certain embodiments of the said invention and certain structural features thereof, it is understood that I am not to be strictly limited to the structural forms or features here shown, but that I may vary the same in minor details so as to best adapt the invention to practical needs and requirements, not departing however from the spirit of the invention as defined in the appended claims.

I claim:

1. In a wire connecter embodying a conventional form of elongated and longitudinally slotted keeper with spaced legs of substantially equal length, the end of one of the legs having an aperture therethrough, the combination of a washer having a ring adapted to freely embrace the keeper and a rib adapted to freely pass within the slot thereof, the apertures between the ring and the rib at either side of the rib being adapted to engage the legs of the keeper, a short, open wire link passed freely, loosely and swingingly through the said aperture of the end of one leg of the keeper and freely through one of the leg engaging apertures of the washer, and a pellet at the opposite extremity of the link, the pellet being larger than the said leg engaging aperture of the washer, whereby the washer is freely and swingingly anchored to the keeper.

2. In a wire connecter embodying a conventional form of elongated longitudinally slotted and exteriorly threaded keeper, the slot thereof forming spaced legs of substantially equal length, the end of one of the legs having an aperture therethrough, the combination of a bearing element having a ring for freely embracing the keeper and a rib for freely passing within the slot thereof, the apertures between the ring and rib being adapted to engage the legs of the keeper, a short pendant having an attenuated portion passed freely through one of the said leg engaging apertures of the bearing element and linked freely through the said aperture of the end of one leg of the keeper, whereby it is loosely and swingingly anchored to the said leg, and an enlarged portion adapted to impinge the ring and rib of the bearing element on the withdrawal movement of the latter, whereby the bearing element is freely anchored to the pendant, and a nut adapted to threadedly engage the legs of the keeper, the nut being rotatably anchored to the outer face of the bearing element so that the two may simultaneously and operatively engage the keeper, the pendant being adapted to pass through the orifice of the nut and to fold transversely within the slot of the keeper, whereby the conventional process of taping the connecter is facilitated.

3. In a wire connecter embodying a conventional form of elongated, longitudinally slotted and exteriorly threaded keeper the slot thereof providing spaced legs of substantially equal length the said connecter also including a nut threadedly mounted upon the keeper, the combination of a bearing element rotatably mounted upon the inner face of the nut as mounted and freely passed within the slot of the keeper, and a short pendant having an attenuated end portion loosely, freely and swingingly connected to the end of one leg of the keeper, the opposite end of the pendant being enlarged for impinging the bearing element and adjacent margin of the orifice of the nut as the nut is withdrawn from the keeper, whereby the bearing element and nut are loosely, freely and swingingly connected to the keeper, the pendant as a whole being adapted to pass freely within the orifice of the nut and to fold transversely within the slot of the keeper, whereby the conventional process of taping the connecter is facilitated.

JASPER BLACKBURN.